W. G. HERMAN.
SAW SET.
APPLICATION FILED NOV. 16, 1916.
1,242,348.
Patented Oct. 9, 1917.
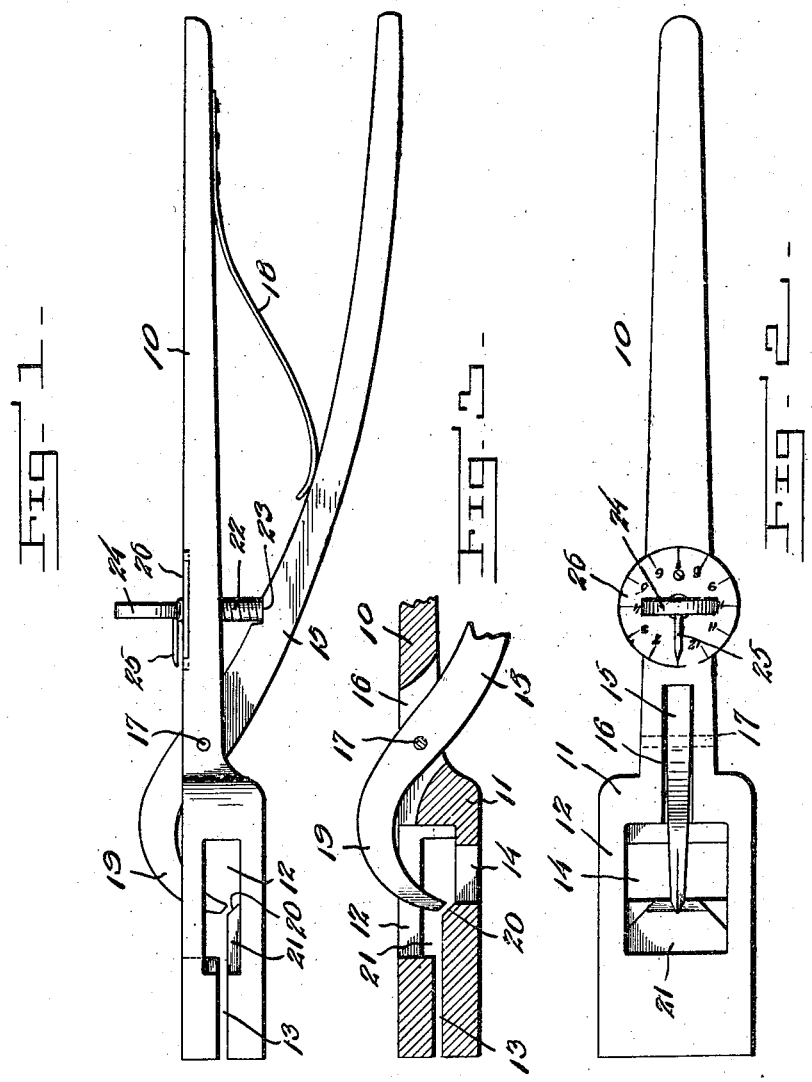
INVENTOR
Walter G. Herman
WITNESSES
BY
ATTORNEY.

UNITED STATES PATENT OFFICE.

WALTER G. HERMAN, OF RAYMOND, WASHINGTON, ASSIGNOR OF ONE-HALF TO AUGUST R. WORLEY, OF MENLO, WASHINGTON.

SAW-SET.

1,242,348.  Specification of Letters Patent.  Patented Oct. 9, 1917.

Application filed November 16, 1916. Serial No. 131,714.

*To all whom it may concern:*

Be it known that I, WALTER G. HERMAN, a subject of the Emperor of Austria, residing at Raymond, in the county of Pacific and State of Washington, have invented certain new and useful Improvements in Saw-Sets, of which the following is a specification.

This invention relates to an improved saw set and the principal object of the invention is to provide an improved saw set of the plier type having an improved saw engaging head and improved tooth bending lever, the lever being pivotally connected with the handle carrying the saw engaging head and improved means being provided for limiting the pivotal movement of the lever in one direction.

Another object of the invention is to so construct this saw set that a fine adjustment can be obtained thus permitting the saw teeth to be bent the desired amount.

Another object of the invention is to so construct this saw set that it will be very easy to handle and to further so construct the tooth engaging end of the setting lever that it may be used in connection with teeth of different sizes.

This invention is illustrated in the accompanying drawings, wherein:—

Figure 1 is a view showing the improved saw set in side elevation.

Fig. 2 is a view showing the improved saw set in top plan.

Fig. 3 is a fragmentary sectional view through one end portion of the improved saw set.

The handle 10 carries a head 11 which is provided with a longitudinally extending pocket 12 leading from the upper face of the head and provided with a restricted inlet 13 and communicating with a well 14 leading through the underface of the head. The setting lever 15 is passed through the opening or passageway 16 and pivotally mounted by means of the pin 17 and extends in spaced relation to the handle 10, a spring 18 being provided for moving the lever outwardly after being pressed toward the handle and thus making the handling of this saw set easier. This lever terminates in a curved jaw 19 which is triangular in cross section and extends in operative relation to the inclined face 20 of the block or anvil 21 upon which the saw will rest while the teeth are being set. A set screw 22 is threaded through the handle 10 to engage the seat 23 of the lever 15 and is provided with a turning head 24 from which extends an arrow or finger 25. This finger 25 extends above the dial 26 carried by the handle 10 and therefore it will be seen that by turning the set screw through the medium of the turning head 24, the finger 25 will indicate upon the dial the amount of pitch which will be given a saw tooth and thus the set can be easily adjusted when ready for use. When in use, the saw blade is placed upon a suitable bench and held against movement by a clamp with the toothed edge extending over the edge of the bench. The saw set is then put in place with the saw blade extending into the pocket 12 and resting upon the anvil 21. The set screw will be set at the proper points according to the amount of pitch it is desired to give the saw teeth and the handle and lever will then be grasped with one hand and pressed to bring the lever toward the handle. This will swing the jaw 19 toward the inclined face 20 of the anvil 21 and the end of the jaw will engage the tooth of the saw and bend the tooth into flat engagement with the inclined face of the anvil. The saw set will then be moved to the next tooth to be set and the operation repeated.

It will thus be seen that with this saw set the teeth of the saw may be very easily and quickly bent the desired amount and it will be further seen that by means of the improved adjustment, or set screw, the amount of pitch to be given the teeth can be easily provided for. It will be further seen that there is no danger of this adjustment slipping as the set screw is threaded through the handle 10 and pressure of the lever will not interfere with this adjustment, this being particularly true as the seat 23 provides a flat face for engaging the end of the set screw thus preventing bending of the set screw.

What is claimed is:—

A saw set comprising a handle, a head at one end of said handle provided with a well leading through the lower face and with a pocket leading from the upper face and also provided with an inlet leading through the end face of the head, the pocket communicating with the well, an anvil in the pocket provided with an inclined end face leading to the well, and a lever pivotally connected with said handle and terminating in a jaw extending into the pocket in operative relation to the inclined face of said anvil.

In testimony whereof I affix my signature in presence of two witnesses.

WALTER G. HERMAN.

Witnesses:
W. E. LOVERING,
GEO. PHILLIPS.

Copies of this patent may be obtained for five cents each, by addressing the "Commissioner of Patents, Washington, D. C."